United States Patent
Hsiao et al.

(10) Patent No.: US 10,938,846 B1
(45) Date of Patent: Mar. 2, 2021

(54) ANOMALOUS LOGON DETECTOR FOR PROTECTING SERVERS OF A COMPUTER NETWORK

(71) Applicant: Trend Micro Incorporated, Tokyo (JP)

(72) Inventors: Chih-Hsun Hsiao, Taipei (TW); Yin-Tzu Lin, Taipei (TW); Yen-Ying Lee, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 232 days.

(21) Appl. No.: 16/196,277

(22) Filed: Nov. 20, 2018

(51) Int. Cl.
*H04L 29/06* (2006.01)

(52) U.S. Cl.
CPC ...... *H04L 63/1425* (2013.01); *H04L 63/1416* (2013.01)

(58) Field of Classification Search
CPC ................. H04L 63/1425; H04L 63/1416
USPC ............................................. 726/23
See application file for complete search history.

(56) References Cited

U.S. PATENT DOCUMENTS

| | | | |
|---|---|---|---|
| 7,571,180 B2 | 8/2009 | Minyailov | |
| 7,657,616 B1 | 2/2010 | Poling et al. | |
| 7,814,533 B2 | 10/2010 | Devine et al. | |
| 8,032,930 B2 | 10/2011 | Hicks | |
| 8,479,259 B2 | 7/2013 | Devine et al. | |
| 8,495,724 B2 | 7/2013 | Devine et al. | |
| 8,955,091 B2 * | 2/2015 | Kailash | H04L 63/1425 726/11 |
| 9,047,387 B2 | 6/2015 | Hicks | |
| 9,537,861 B2 | 1/2017 | Lin | |
| 9,537,880 B1 * | 1/2017 | Jones | G06F 21/554 |
| 10,021,088 B2 | 7/2018 | Innes et al. | |
| 10,122,703 B2 | 11/2018 | Innes et al. | |
| 2018/0248918 A1 * | 8/2018 | Shen | H04L 63/205 |
| 2018/0375891 A1 * | 12/2018 | Juncker | H04L 63/101 |
| 2019/0098068 A1 * | 3/2019 | Iliofotou | H04L 67/1002 |
| 2019/0319961 A1 * | 10/2019 | Levy | H04L 41/20 |

OTHER PUBLICATIONS

Bakar et al., "Adaptive authentication based on analysis of user behavior," doi: 10.1109/SAI.2014.6918248, 2014, pp. 601-606. (Year: 2014).*

Tao et al., "An Abnormal Login Detection Method Based on Multi-source Log Fusion Analysis", doi: 10.1109/ICBK.2019.00038, 2019, pp. 229-235. (Year: 2019).*

He et al., "Big-Data Analysis of Multi-Source Logs for Network Anomaly Detection", doi: 10.1109/ICCSS.2018.8572364, 2018, pp. 168-173. (Year: 2018).*

* cited by examiner

*Primary Examiner* — Peter C Shaw
(74) *Attorney, Agent, or Firm* — Okamoto & Benedicto LLP (57) ABSTRACT

A server hosted by a server computer is protected against anomalous logons. A working time profile is generated from an access log that has a record of logons to the server. Counts of access events per time period (e.g., per hour) are parsed from the access log, and processed using statistical procedures to find candidate working hours. A working time range includes candidate working hours. An account logging on the server is detected. The logon by the account is deemed to be anomalous when the logon is at a time outside the candidate working hours.

8 Claims, 10 Drawing Sheets

ANOMALOUS LOGON DETECTOR FOR PROTECTING SERVERS OF A COMPUTER NETWORK

BACKGROUND OF THE INVENTION

1. Field of the Invention

The present invention relates generally to computer security, and more particularly but not exclusively to methods and systems for detecting anomalous logons.

2. Description of the Background Art

A server, which may be hosted by a server computer with corresponding server software, provides one or more services to a plurality of users. Examples of services that a server may provide include data storage, accounting, database, inventory control, etc. Each user may have an account for logging on the server to access the service. Because the server is typically accessible over a computer network and has many users, the server is vulnerable to unauthorized logons. That is, an attacker may logon to the server to steal confidential information, perform unauthorized transactions, etc.

SUMMARY

In one embodiment, a server hosted by a server computer is protected against anomalous logons. A working time profile is generated from an access log that has a record of logons to the server. Counts of access events per time period (e.g., per hour) are parsed from the access log, and processed using statistical procedures to find candidate working hours. A working time range includes candidate working hours. An account logging on the server is detected. The logon by the account is deemed to be anomalous when the logon is at a time outside the working time range.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
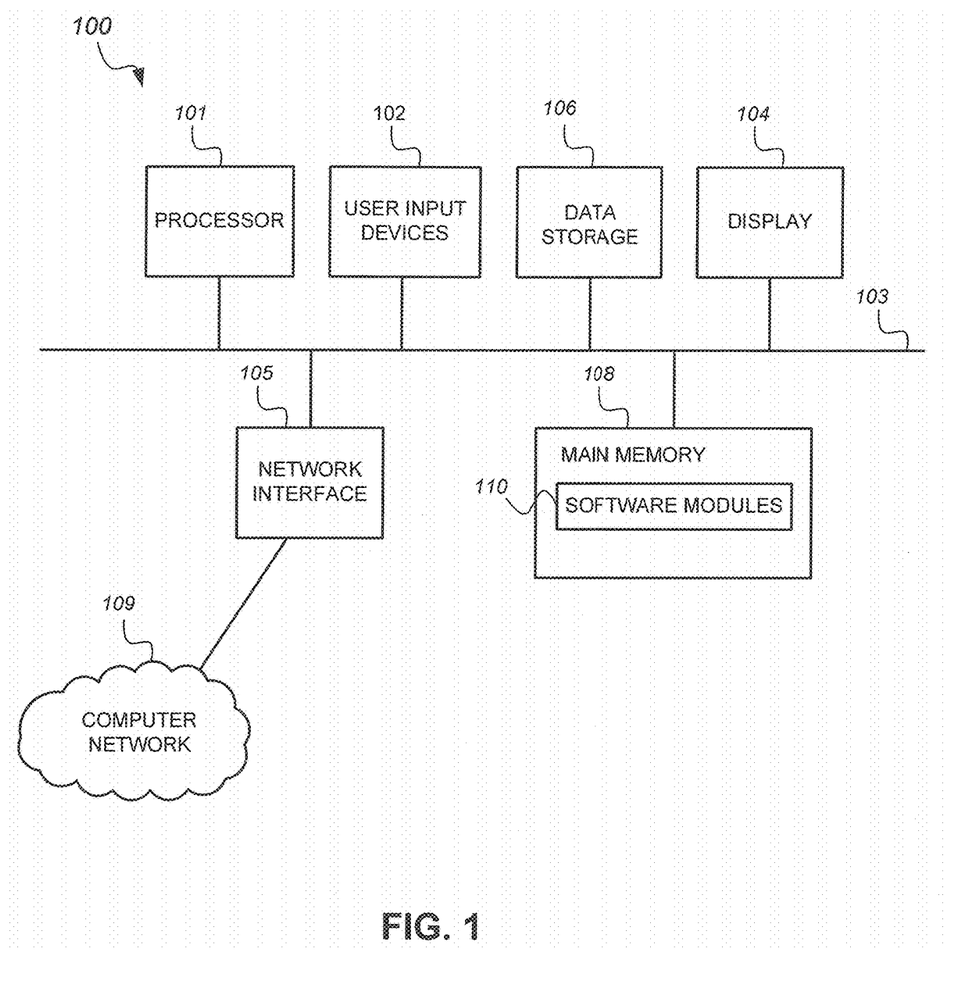
FIG. 1 is a logical diagram of a computer system that may be employed with embodiments of the present invention.

FIG. 1 is a logical diagram of a computer system 100 that may be employed with embodiments of the present invention. The computer system 100 may be employed as a server computer, a backend computer, and/or other computers described below. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

In embodiments where the computer system 100 is configured as a server computer (e.g., FIG. 2, server computer 220), the software modules 110 may comprise a service module, an access log, and a security module. In embodiments where the computer system 100 is configured as a backend computer (e.g., FIG. 2, backend computer 210), the software modules 110 may comprise a profiler.

Figure 2:
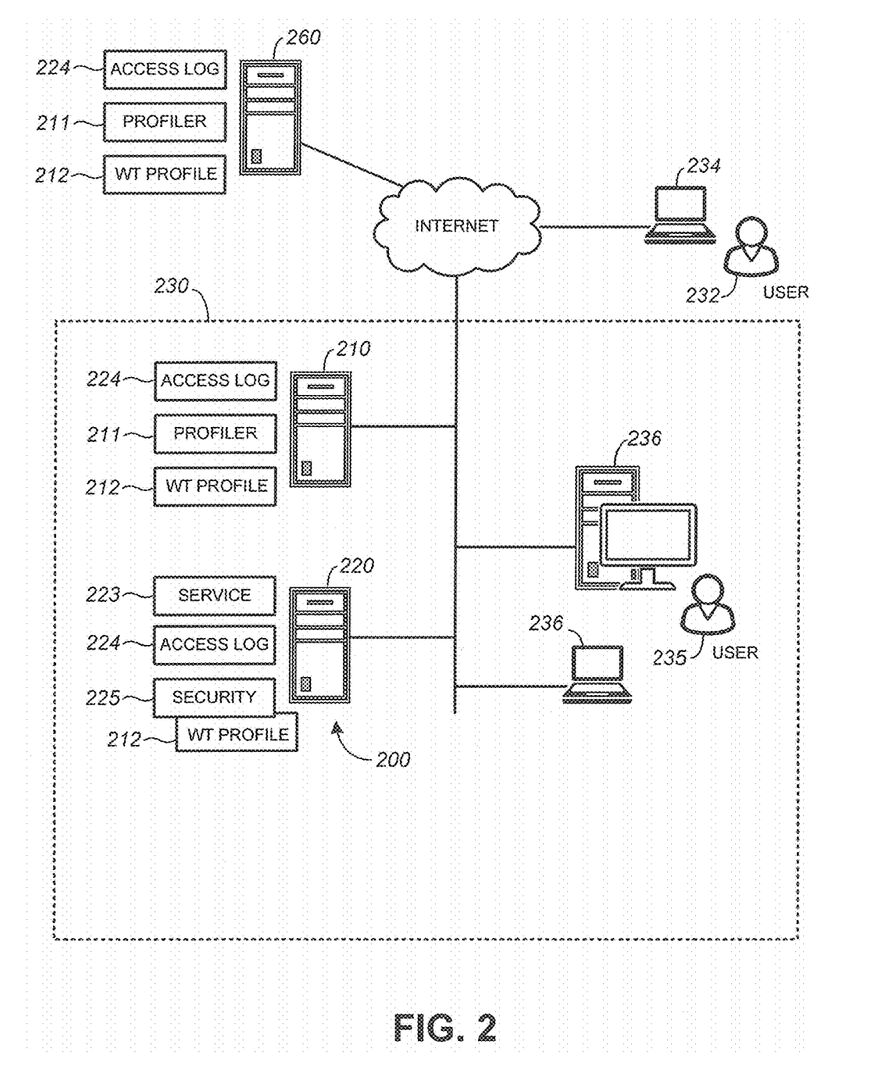
FIG. 2 is a logical diagram of an enterprise computer network in accordance with an embodiment of the present invention.

FIG. 2 is a logical diagram of an enterprise computer network 230 in accordance with an embodiment of the present invention. The enterprise computer network 230 is a private computer network in that it is not generally accessible to the public. The enterprise computer network 230 may be that of a private company, government, or other organization, for example. In the example of FIG. 2, the computer network 230 includes a server computer 220, a backend computer 210, and a plurality of user computers 236. Other network components, such as routers, gateways, etc. are not shown.

In one embodiment, a server 200 is hosted by a server computer 220 that has a service module 223, an access log 224, and a security module 225. The service module 223 may comprise server software for providing a service to a plurality of users, including users 232 and 235. The users 232 and 235 may be employees of a company that owns and maintains the enterprise computer network 230. The user 235 may employ a computer 236 to access the server 200 from within the perimeter of the enterprise computer network 230. The user 232 may employ a computer 234 to access the server 200 from outside the perimeter of the enterprise computer network 230, such as by secure private virtual network, over the Internet. Users may have corresponding accounts for logging on the server 200. As can be appreciated, operating systems and some processes may also have accounts for logging on the server 200.

The server 200 may provide services to the different departments of the company, such as human resources department, accounting department, engineering department, etc. As particular examples, the service module 223 may provide a data storage or database service for storing confidential information of the company, or an authorization service for performing transactions on behalf of the company, such as money transfer.

The server 200 may be configured to record, in the access log 224, detected events pertaining to logons to the server 200. In one embodiment, the access log 224 is that of an Active Directory (AD) directory service promulgated by the Microsoft Corporation. More particularly, the server 200 may be running Active Directory Domain Services as a domain controller. An access event is an instance of an account logging on to the server 200. The server 200 may record the time stamp (time and date) of the access event, account information (e.g., account name, account domain, etc.), information regarding the computer employed to logon (e.g., workstation name, host name, internet protocol address, port information, etc.), and other information in the access log 224.

In one embodiment, a working time (WT) profile 212 indicates a working time range during which usage of the server 200 is deemed to be normal. The working time profile 212 may be in the form of "(start time, end time)", where start time indicates the beginning of the working time range and end time indicates the end of the working time range. An account that logons to the server 200 at a time during the working time range, i.e., between the start time and the end time, may be deemed to be using the server 200 during normal working hours of the company. Logging on the server 200 at a time outside the working time range may be deemed to be anomalous.

The security module 225 may be configured to detect a logon to the server 200, and consult the working time profile 212 to determine whether the logon is normal or anomalous. As a particular example, the security module 225 may detect an account logging on the server 200 at a particular time and determine whether logging on at that particular time is normal or anomalous based on the working time profile 212. In one embodiment, when the particular time is outside the working time range (i.e., the logon is anomalous) and the account has not previously logged on the server 200 (e.g., based on information in the access log 224), the security module 225 deems the logon to be anomalous and accordingly performs a response action to protect the server 200. The response action may include blocking the account from accessing the server 200, raising an alert (e.g., notifying an administrator by email, text, and/or log), etc. This way, the security module 225 prevents attacks against the server 200 by users performing unauthorized access outside normal working hours, by cybercriminals who try to attack the server 200 outside normal working hours, etc.

In one embodiment, the backend computer 210 comprises a profiler 211, which is configured to automatically generate the working time profile 212 from access events recorded in the access log 224. More particularly, the profiler 211 may be configured to receive the access log 224 from the server computer 220, parse the access log 224 to identify access events, generate counts of access events per time period, run a plurality of statistical procedures on the counts of access events to find possible candidate working time periods, aggregate the results of the statistical procedures to find candidate working time periods, determine a working time range with a start time and an end time, and generate the working time profile 212 indicating the working time range. In one embodiment, the profiler 211 generates the working time profile 212 based on hourly counts of access events indicated in the access log 224. In that example, the time period is an hour, and an access event count is generated for each hour. The working time range may be determined from a data gathering period of a day (i.e., access events in a single day), a month (i.e., access events in a single month), etc. depending on implementation.

In the example of FIG. 2, the backend computer 210 provides the working time profile 212 to the server computer 220 over the computer network. In other embodiments, the profiler 211 is hosted by the server computer 220 to generate the working time profile 212 therein. In yet other another embodiment, the profiler 211 is hosted by a backend computer 260 that is outside the perimeter of the enterprise computer network 230. The backend computer 260 may be configured to generate the working time profile 212 from the access log 224 of the server computer 220 as a third-party service. The backend computer 260 may provide the working time profile 212 to the server computer 220 over the Internet.

As can be appreciated, arbitrarily setting the working time range may lead to unacceptable number of false positives. For example, manually determining a working time range based on published business hours does not take into account that employees may work past or before the published business hours. Some employees may also work in different time zones. Worse, some operating systems and processes that have accounts on the server 200 may access the server 200 during odd hours.

Embodiments of the present invention allow for automatic generation of the working time profile 212 based on counts of access events, enabling the security module 225 to better protect the server 200 from unauthorized access. Embodiments of the present invention facilitate security of the server 200 by allowing for identification of anomalous logons based on whether the logon is at a time outside the working time range and whether the account logging on has previously logged on the server 200.

Figure 3:
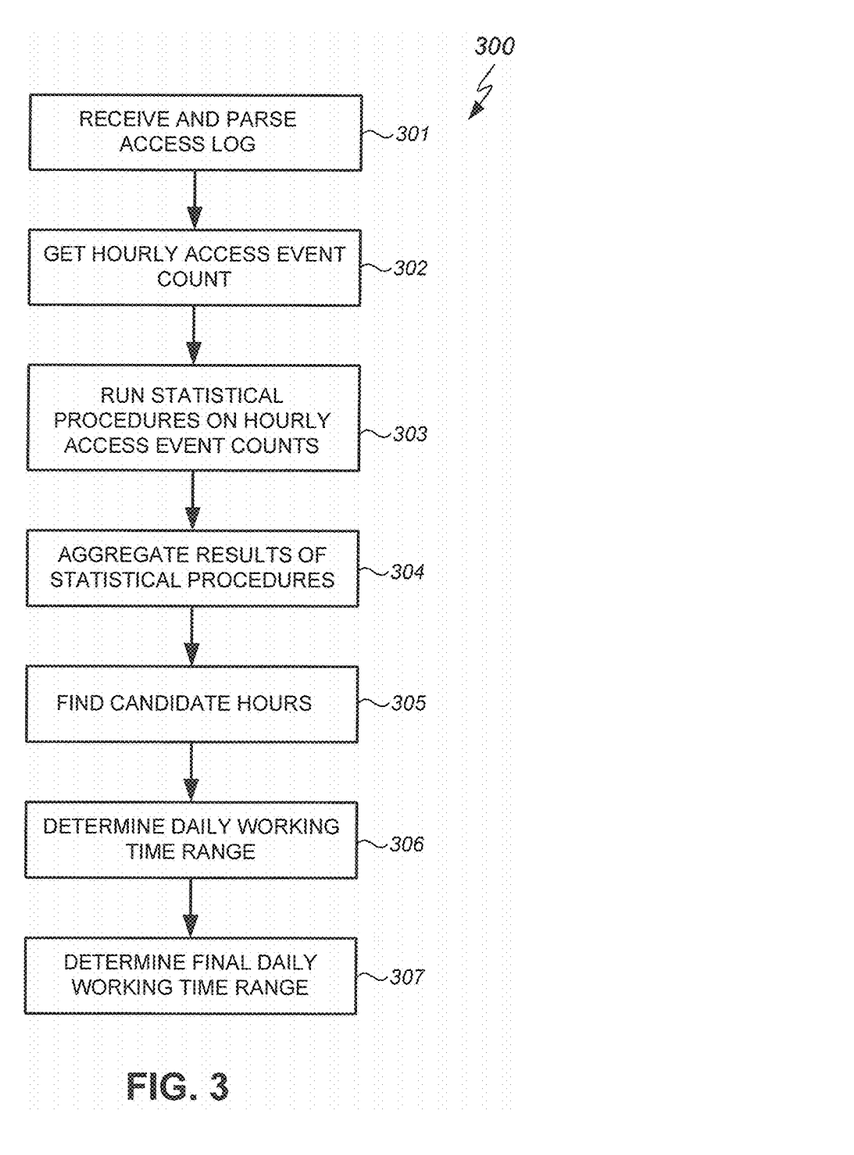
FIG. 3 is a flow diagram of a computer-implemented method of determining a working time range in accordance with an embodiment of the present invention.

FIG. 3 is a flow diagram of a computer-implemented method 300 of determining a working time range in accordance with an embodiment of the present invention. In one embodiment, the method 300 is performed by a profiler 211.

In the example of FIG. 3, the access log 224 of the server 200 is received by the profiler 211. The profiler 211 parses the access log 224 to identify access events indicating a logon to the server 200 (step 301). From the access log 224, the profiler 211 gets an access event count per hour (or some other time period) (step 302). Table 1 shows an example access event count per hour.

TABLE 1

| HOUR | EVENT COUNT |
|------|-------------|
| 00   | 23018       |
| 01   | 27931       |
| 02   | 60190       |
| 03   | 65343       |

TABLE 1-continued

| HOUR | EVENT COUNT |
| --- | --- |
| 04 | 38198 |
| 05 | 35968 |
| 06 | 34974 |
| 07 | 36232 |
| 08 | 29798 |
| 09 | 30586 |
| 10 | 25303 |
| 11 | 123800 |
| 12 | 41676 |
| 13 | 23557 |
| 14 | 22178 |
| 15 | 22090 |
| 16 | 22915 |
| 17 | 21947 |
| 18 | 21823 |
| 19 | 22602 |
| 20 | 21202 |
| 21 | 21338 |
| 22 | 21424 |
| 23 | 21821 |

In the example of Table 1, HOUR "00" is for the time period 00:00 to 00:59 (i.e. first hour of 24-hours), HOUR "01" is for the time period 01:00 to 01:59 (i.e. second hour of the 24-hours) etc. The profiler 211 determines, from the access log 224, that there are 23018 logons to the server 200 during hour 00, that there are 27931 logons to the server 200 during hour 01, etc.

As its name implies, a "candidate working hour" is an hour that may be a working hour. That is, a candidate working hour may be, but not definitely, a time period during which logon to the server 200 is deemed to be normal. In the example of FIG. 3, the hourly access event counts are processed through a plurality of different statistical procedures (step 303). Each of the statistical procedures generates a separate result, with each of result indicating whether or not the corresponding hour should be considered as a candidate working hour. In one embodiment, a POSITIVE result from a statistical procedure indicates that the statistical procedure deems the hour to be a candidate working hour. Otherwise, a NEGATIVE result from a statistical procedure indicates that the statistical procedure does not deem the hour to be a candidate working hour. Example statistical procedures that may be employed in accordance with embodiments of the present invention are further discussed below with reference to FIGS. 6-12.

The results of the statistical procedures that were used to process the access event counts are taken into account in determining whether an hour is a candidate working hour. In the example of FIG. 3, this is performed by aggregating the results of the statistical procedures into a single result (step 304). In one embodiment, the results of the statistical procedures are aggregated using a voting process. That is, each of the results of the statistical procedures is considered as a vote on whether an hour is a candidate working hour. The result of the voting process is then used to find daily candidate working hours (step 305).

For example, a determination of whether a working hour is indeed a candidate working hour may depend on the total number of statistical procedures that gave the hour a POSITIVE result. More particularly, the total number of statistical procedures that gave the hour a POSITIVE result may be compared to a threshold. The hour may be deemed to be a candidate working hour if the total number (also referred to herein as a "tally") of statistical procedures that gave the hour a POSITIVE result is equal to or greater than the threshold. Table 2 provides example results of the statistical procedures for each hour.

TABLE 2

| HOUR | PROC1 | PROC2 | PROC3 | PROC4 | PROC5 | PROC6 | PROC7 | TALLY |
| --- | --- | --- | --- | --- | --- | --- | --- | --- |
| 00 | NEG | NEC | NEC | NEC | NEC | NEC | NEC | 0 |
| 01 | NEC | NEC | NEC | NEC | NEC | NEC | NEC | 0 |
| 02 | NEC | NEC | NEC | NEC | NEC | NEC | NEC | 0 |
| 03 | NEC | NEC | NEC | NEC | NEC | NEC | NEC | 0 |
| 04 | NEC | NEC | NEC | NEC | NEC | NEG | NEC | 0 |
| 05 | NEC | NEC | NEC | NEC | NEC | NEC | NEC | 0 |
| 06 | NEC | NEC | NEC | NEC | NEC | NEC | NEC | 0 |
| 07 | NEC | NEC | POS | NEC | NEC | NEC | NEC | 1 |
| 08 | NEC | POS | POS | NEC | NEC | NEC | NEC | 2 |
| 09 | POS | POS | POS | POS | POS | POS | NEC | 6 |
| 10 | POS | POS | POS | POS | POS | POS | POS | 7 |
| 11 | POS | POS | NEC | POS | POS | POS | POS | 6 |
| 12 | POS | POS | POS | POS | NEC | POS | POS | 6 |
| 13 | POS | NEC | POS | POS | POS | POS | POS | 6 |
| 14 | POS | POS | POS | POS | POS | POS | POS | 7 |
| 15 | POS | POS | POS | POS | POS | POS | POS | 7 |
| 16 | POS | POS | NEG | POS | POS | POS | POS | 6 |
| 17 | POS | POS | POS | POS | POS | POS | POS | 7 |
| 18 | POS | POS | POS | POS | POS | POS | POS | 7 |
| 19 | POS | POS | POS | POS | POS | NEG | POS | 6 |
| 20 | POS | POS | NEG | POS | POS | NEG | NEG | 4 |
| 21 | NEG | POS | POS | NEC | POS | NEC | NEC | 3 |
| 22 | NEC | NEC | NEC | NEC | NEC | NEC | NEC | 0 |
| 23 | NEC | NEC | NEC | NEC | NEC | NEC | NEC | 0 |

In the example of Table 2, PROC1 is a first statistical procedure, PROC2 is a second statistical procedure, etc. Seven statistical procedures are used in this example. As shown in Table 2, all of the statistical procedures gave a NEGATIVE (NEG) result for HOUR 00, yielding a TALLY (i.e., number of POSITIVE results) of 0 for HOUR 00. In contrast, all of the statistical procedures gave a POSITIVE (POS) result for HOUR 10, yielding a TALLY of 7. Some other hours received a mix of POSITIVE and NEGATIVE results. For example, HOUR 21 received a POSITIVE result from statistical procedures PROC2, PROC3, and PR005 and a NEGATIVE result from statistical procedures PROC1, PROC4, PROC6, and PROC7, yielding a TALLY of 3.

In the example of Table 2, the TALLY represents the vote count of the statistical procedures PROC1 to PROC7. To determine whether an hour is a candidate working hour, the TALLY may be compared to a threshold. In one embodiment, the threshold is a median of the TALLYs per day. In the example of Table 2, the median of the TALLYs is 3.5. In the example of Table 2, HOUR 09, HOUR 10, HOUR 11, HOUR 12, HOUR 13, HOUR 14, HOUR 15, HOUR 16, HOUR 17, HOUR 18, AND HOUR 19 each has a TALLY greater than 3.5 (the threshold), making each of them a candidate working hour.

The profiler 211 may determine a working time range with a start time and an end time from the candidate working hours (step 306). The working time range may have a predetermined length, such as 8 hours long, 9 hours long, etc. For example, given a working time range of 8 to 10 hours, the profiler 211 is configured to consider a working time range that has 8 hours, 9 hours, or 10 hours. The possible lengths of the working time range may be set in the profiler 211, and will vary depending on the company's policies or needs.

In one embodiment, the profiler 211 is configured to find a working time range using the following criteria:
(a) Longest possible working time range. That is, given two candidate working time ranges, the longer working time range is selected.
(b) If several working time ranges have the same length, the working time range with the earliest start time is selected.
(c) For any working time range, the start time and the end time must be candidate working hours.
(d) For any working time range, allow, at most, a predetermined interval consisting of non-candidate working hours. For example, between the start time and the end time of the working time range, there can be at most a 4 hour interval of non-candidate working hours. In that example, the working time range can have non-candidate working hours, but the non-candidate working hours within the working time range cannot be more than 4.

An example pseudo code for finding a working time range is given in Table 3 below. In the example of Table 3, the working time range may have a length of 8 to 10 hours, and has less than 4 non-candidate hours between the start time and the end time. As can be appreciated, other algorithms may also be employed without detracting from the merits of the present invention.

TABLE 3

```
for gap in 10 to 8 (working time range):
  result =[]
  For start_time in 1 to 24:
    end_time = start_time+gap
    If (start_time is candidate working hour) and
       (end_time is candidate working hour) and
       (there are less than 4 hours that are not candidate working hours
between start_time and end_time)
      return [start_time, end_time]
# if there is no matching working time range
return [-1, -1]
```

The working time range determined from steps 301-306 provides a daily working time range. That is, the working time range determinations of steps 301-306 give a daily start time and a daily end time. For a more accurate determination of the working time range, the median of the daily start time may be taken for a predetermined window size, i.e., data gathering period (e.g., 30 day window), to get a final daily working time range (step 307).

Figure 4:
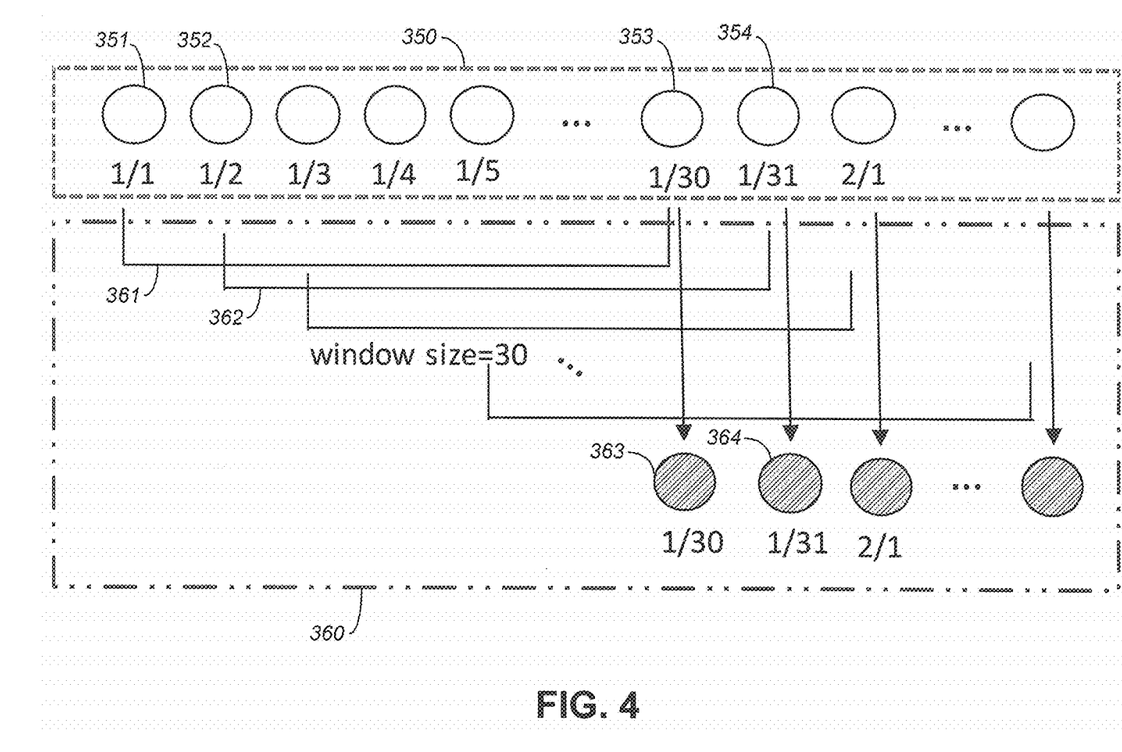
FIG. 4 is pictorial diagram that further illustrates calculation of final daily working time range in the computer-implemented method of FIG. 3.

FIG. 4 is a pictorial diagram that further illustrates calculation of the final daily working time range in the computer-implemented method 300 of FIG. 3. In the example of FIG. 4, each of the circles within the dashed box 350 represents daily start time, as determined by running the daily access event counts through the statistical procedures and finding candidate working hours. The circle 351 is the daily start time for January 1, the circle 352 is the daily start time for January 2, etc. For clarity of illustration, the daily end time corresponding to each daily start time is not shown in the example of FIG. 4.

In the example of FIG. 4, the dashed box 360 shows the sliding windows (see 361, 362, . . . ) used to calculate the final daily start times (circles 363, 364, . . . ). In the example of FIG. 4, the window size for determining the final daily start time is 30 days. In other words, the final daily start time for January 30 (circle 363) is from access event counts from January 1 to January 30 (see window 361), the final daily start time for January 31 (circle 364) is from access event counts from January 2 to January 31 (see window 362), etc. In one embodiment, the median of the daily start times during the window is taken as the final daily start time. More particularly, the final daily start time for January 30 (circle 363) is the median of the daily start times from January 1 to January 30, the final daily start time for January 31 (circle 364) is the median of the daily start times from January 2 to January 31, etc. Using the same process, the median of the daily end times during a window is taken as the final daily end time (not shown).

Figure 5A:
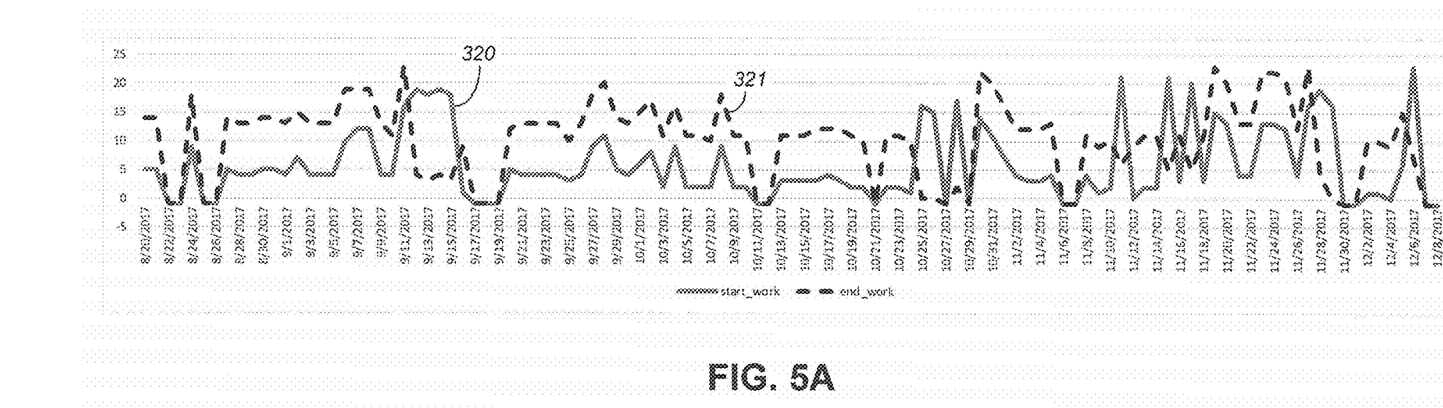
FIG. 5A and FIG. 5B are example graphs of working time range determinations in accordance with embodiments of the present invention.
Figure 5B:
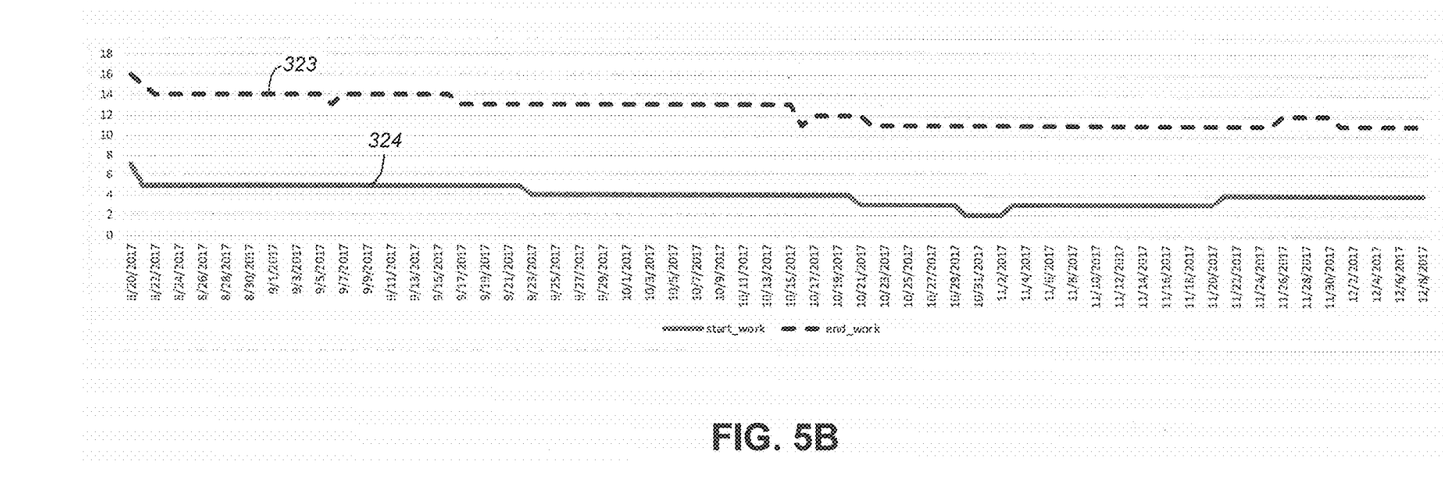

FIG. 5A is an example graph of daily working time range determinations (i.e., FIG. 3, output at step 306), and FIG. 5B is an example graph of final daily working time range determinations (i.e., FIG. 3, output at step 307). The working time range determinations of FIGS. 5A and 5B are from the same access log data. In FIGS. 5A and 5B, the vertical axis represents hours and the horizontal axis represents days, with the top curves (FIG. 5A, 321; FIG. 5B, 323) indicating end times and the bottom curves (FIG. 5A, 320; FIG. 5B, 324) indicating start times. The final daily working time range determinations of FIG. 5B have less fluctuations, and are thus more reliable predictor of working time range, compared to the daily working time range determinations of FIG. 5A.

FIGS. 6-12 show flow diagrams of statistical procedures for determining candidate working hours in accordance with embodiments of the present invention.

Figure 6:
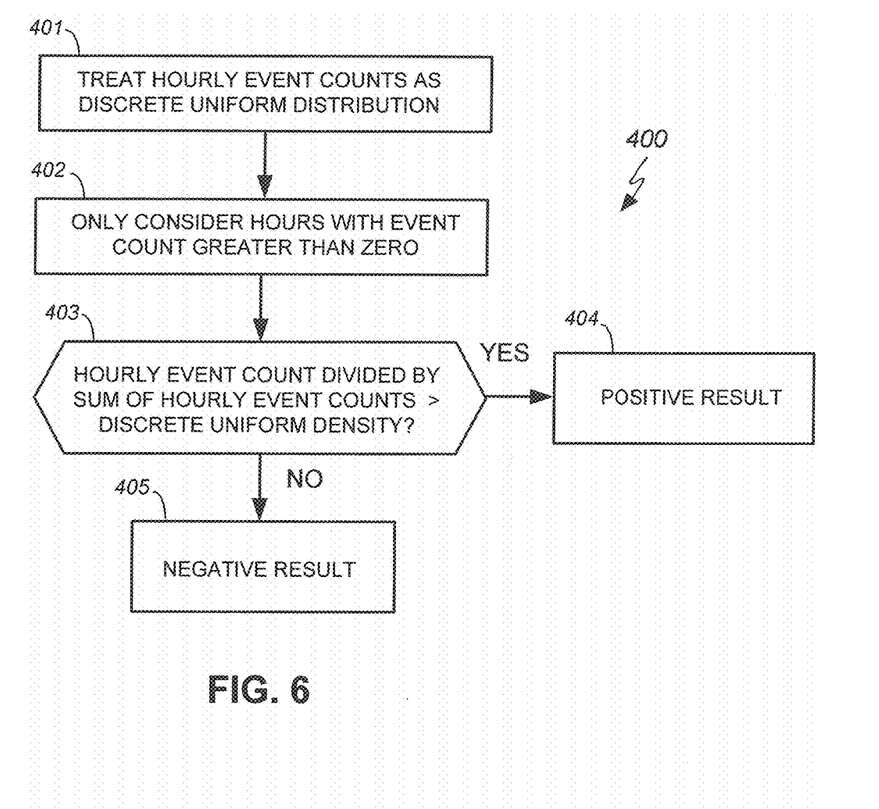
FIGS. 6-12 show flow diagrams of statistical procedures for determining candidate working hours in accordance with an embodiment of the present invention.

FIG. 6 is a flow diagram of a statistical procedure 400 in accordance with an embodiment of the present invention. In the example of FIG. 6, the access event counts of the hours are treated as having discrete uniform distribution (step 401). In one embodiment, only hours with an access event count greater than zero are considered in the calculation of the discrete uniform distribution (step 402). For each particular hour, the access event count of the particular hour is divided by the sum of access event counts of hours that have a non-zero access event count, and the resulting quotient is compared to the discrete uniform density (step 403). That is, given an access event count of COUNT for the particular hour and N is the sum of access event counts of hours that have a non-zero access event count, the procedure 400 compares COUNT/N to the discrete uniform density of the discrete uniform distribution of hours that have a non-zero access event count. When COUNT/N is greater than the discrete uniform density, the statistical procedure 400 gives the hour a POSITIVE result (step 403 to step 404). Otherwise, the particular hour is given a NEGATIVE result (step 403 to step 405).

Figure 7:
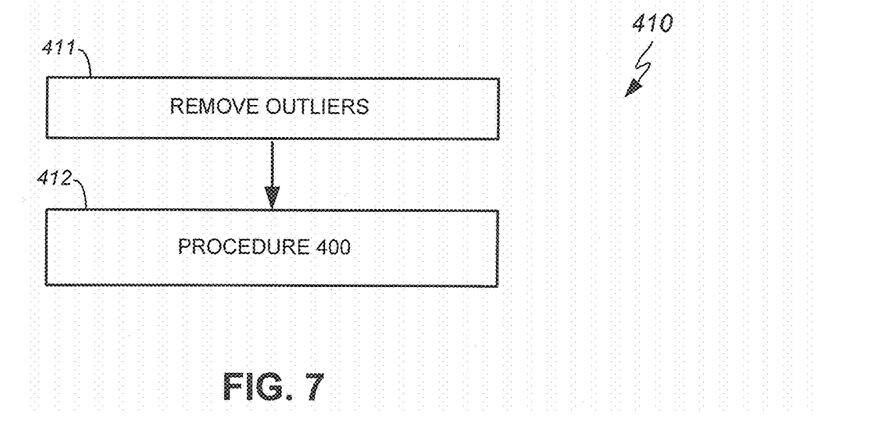

FIG. 7 is a flow diagram of a statistical procedure 410 in accordance with an embodiment of the present invention. In the example of FIG. 7, outliers are removed from consideration in finding candidate working hours (step 411). In one embodiment, a particular hour with an access event count that is greater than the mean of the access event counts plus standard deviation is removed from further consideration. More particularly, an access event count that is greater than the mean of the access event counts plus standard deviation may be considered an outlier. In that case, the hour with that access event count is removed by the statistical procedure 410 from further processing. After removing the outliers, the statistical procedure 400 is applied on the remaining hours as explained with reference to FIG. 6 (step 412).

Figure 8:
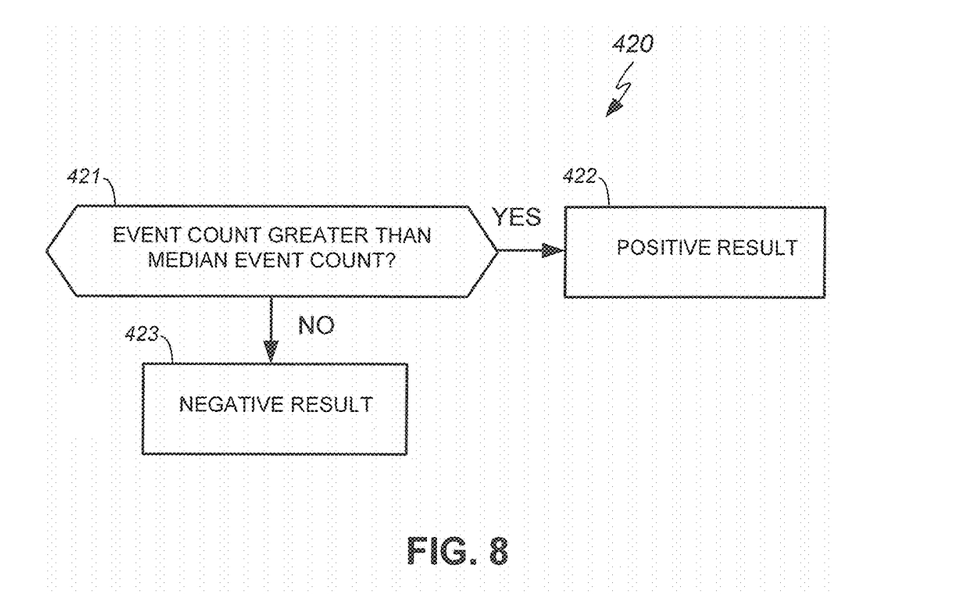

FIG. 8 is a flow diagram of a statistical procedure 420 in accordance with an embodiment of the present invention. In the example of FIG. 8, when the access event count of a particular hour is greater than the median of the access event counts, the particular hour is given a POSITIVE result (step 421 to step 422). Otherwise, the particular hour is given a NEGATIVE result (step 421 to step 423).

Figure 9:
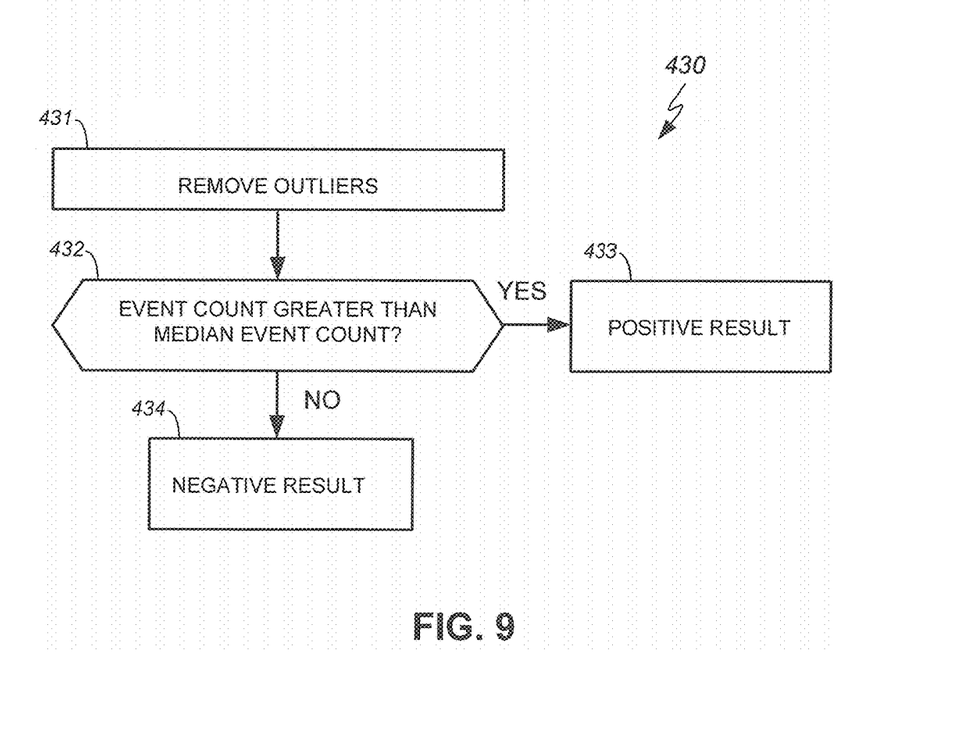

FIG. 9 is a flow diagram of a statistical procedure 430 in accordance with an embodiment of the present invention. In the example of FIG. 9, outliers are removed from consideration in finding candidate working hours (step 431). In one embodiment, a particular hour with an access event count that is greater than the mean of the access event counts plus standard deviation is removed from further consideration. More particularly, an access event count that is greater than the mean of the access event counts plus standard deviation may be considered an outlier. In that case, the hour with that access event count is removed by the statistical procedure 430 from further processing.

After removing the outliers, when the access event count of a remaining particular hour is greater than the median of the access event counts, the statistical procedure 430 gives the remaining particular hour a POSITIVE result (step 432 to step 433). Otherwise, the particular hour is given a NEGATIVE result (step 432 to step 434).

Figure 10:
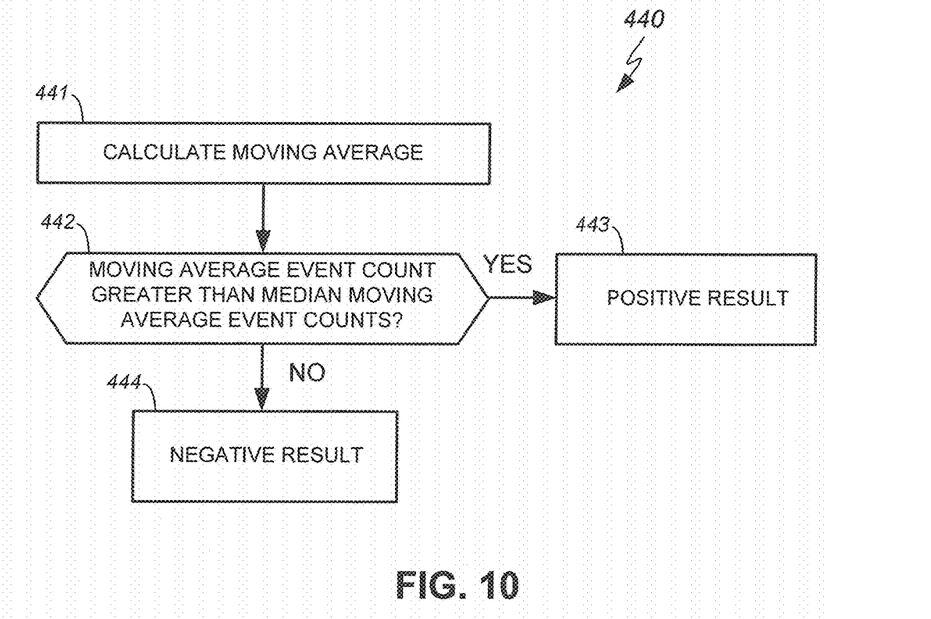

FIG. 10 is a flow diagram of a statistical procedure 440 in accordance with an embodiment of the present invention. In the example of FIG. 10, a moving average of the access event counts is calculated for each of the hours (step 441). The moving average may be based on a predetermined sliding window size, such as 3 (i.e., three consecutive hours) or other window size depending on the application. The moving average of the access event count of each of the hours is taken as the access event count of that hour. When the resulting moving average access event count of a particular hour is greater than the median of the moving average access event counts, the statistical procedure 440 gives the particular hour a POSITIVE result (step 442 to step 443). Otherwise, the statistical procedure 440 gives the particular hour a NEGATIVE result (step 442 to step 444).

A moving average example is now illustrated. To simplify illustration, suppose there are only three hours in one day, with an hourly event count of:

| HOUR | 01 | 02 | 03 |
|---|---|---|---|
| COUNT | 01 | 03 | 05 |

That is, HOUR 01 has an access event count of 1, HOUR 02 has an access event count of 3, and HOUR 03 has an access event count of 5. In a first step, the access event count data are concatenated, e.g., to compensate for different time zones, as follows:

| HOUR | 01 | 02 | 03 | 01 | 02 | 03 |
|---|---|---|---|---|---|---|
| COUNT | 01 | 03 | 05 | 01 | 03 | 05 |

In a second step, a moving average with window size equals 3 is taken as follows:

| HOUR | 01 | 02 | 03 | 01 | 02 | 03 |
|---|---|---|---|---|---|---|
| AVG CNT | NA | NA | 03 | 03 | 03 | 03 |

In the above example, the moving average count (AVG CNT) has a window size of 3, i.e., 3 hours per calculation. HOUR 01 and HOUR 02 do not have 3 preceding hours, so have no moving average access event count (NA or not applicable). More particularly, First HOUR 01 has a moving average count of NA;
First HOUR 02 has a moving average count of NA;
First HOUR 03 has a moving average count of 3, i.e., (1+3+5)/3;
Second HOUR 01 has a moving average count of 3, i.e., (3+5+1)/3;
Second HOUR 02 has a moving average count of 3, i.e., (5+1+3)/3;
Second HOUR 03 has a moving average count of 3, i.e., (1+3+5)/3;

In a third step, the HOURS with no moving average count (i.e., NA) are removed from consideration, resulting in,

| HOUR | 03 | 01 | 02 | 03 |
|---|---|---|---|---|
| AVG CNT | 03 | 03 | 03 | 03 |

In a fourth step, the duplicate access event counts per hour are removed, resulting in the removal of the first HOUR 03 to yield the moving average count per hour as follows,

| HOUR | 01 | 02 | 03 |
|---|---|---|---|
| AVG CNT | 03 | 03 | 03 |

Figure 11:
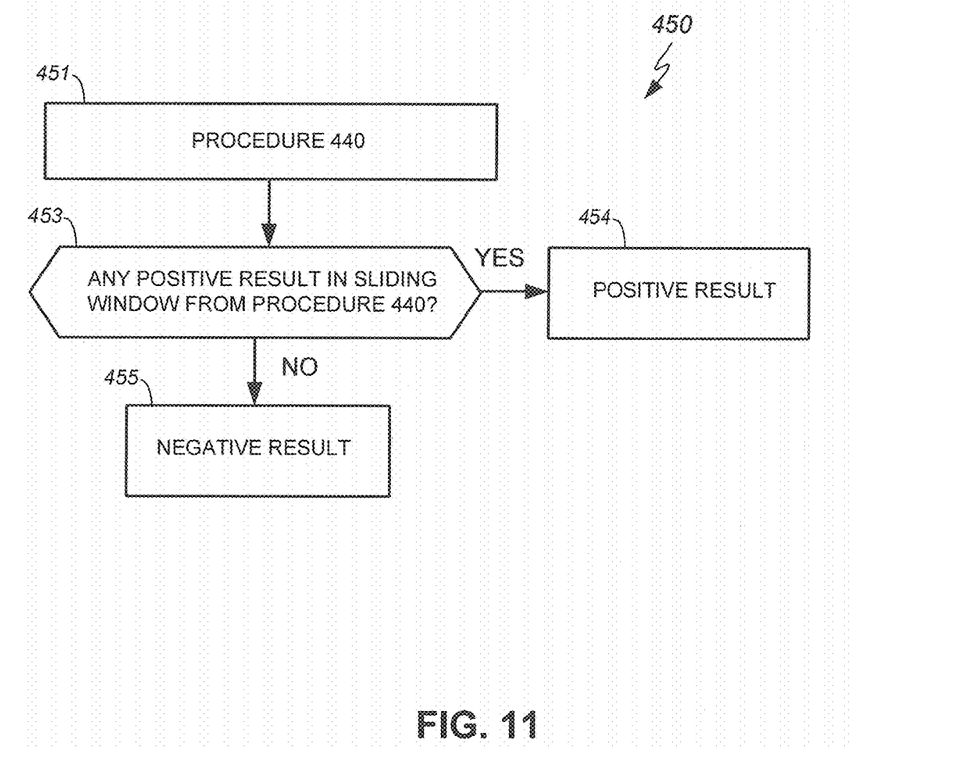

FIG. 11 is a flow diagram of a statistical procedure 450 in accordance with an embodiment of the present invention. In the example of FIG. 11, the statistical procedure 440 is applied to the access event counts to get the result (i.e., POSITIVE or NEGATIVE) given by the statistical procedure 440 to each hour as explained with reference to FIG. 10 (step 451). If the statistical procedure 440 gave a POSITIVE result to any of the hours within a sliding window of a particular hour, the statistical procedure 450 gives the particular hour a POSITIVE result (step 453 to step 454). Otherwise, the statistical procedure 450 gives the particular hour a NEGATIVE result (step 453 to step 455). For example, assuming the statistical procedure 440 of FIG. 10 gave the following results,

| HOUR | 01 | 02 | 03 | 04 | 05 | 06 |
|---|---|---|---|---|---|---|
| RESULT | POS | NEG | NEG | NEG | NEG | POS |

In the immediately above example, with a window size of 3, the statistical procedure 450 will give a POSITIVE result to HOUR 03 because HOUR 01 (which is within the sliding window size of 3) has been given a POSITIVE result by the statistical procedure 440. On the other hand, the statistical procedure 450 will give a NEGATIVE result to HOUR 04 because the statistical procedure 440 did not give a POSITIVE result to any of the HOUR 02, HOUR 03, or HOUR 04.

Figure 12:
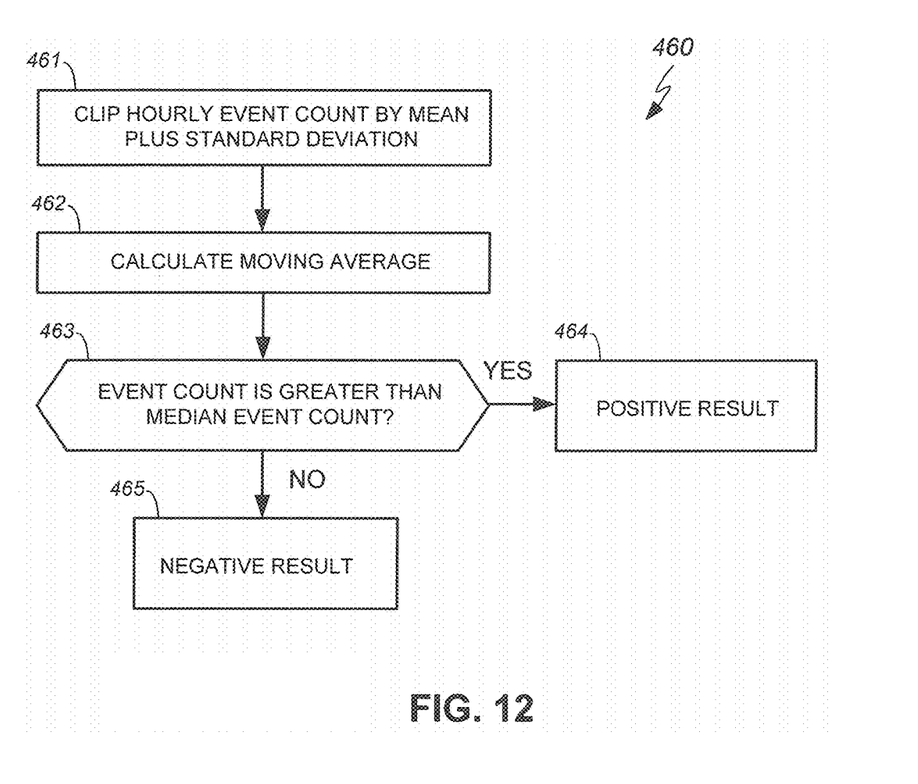

FIG. 12 is a flow diagram of a statistical procedure 460 in accordance with an embodiment of the present invention. In the example of FIG. 12, the access event count for each of the hours is clipped by the mean of the access event counts plus standard deviation (step 461). The clipping limits the possible value of an access event count. As a particular example, assuming that, for a 24 hour data gathering period, the mean of the hourly access event counts is 100 and the standard deviation is 10. Assuming HOUR 02 has an access event count of 10000 and HOUR 03 has an access event count of 100, the clipped access event count of HOUR 02 is 110, i.e., min(100+10, 10000); the clipped access event count of HOUR 03 is 100, i.e., min(100+10, 100). The moving average of the clipped access event counts is calculated for each hour (step 462). When the moving average clipped access event count of a particular hour is greater than the median of the access event counts, the statistical procedure 460 gives the particular hour a POSITIVE result (step 463 to step 464). Otherwise, the statistical procedure 460 gives the particular hour a NEGATIVE result (step 463 to step 465).

Figure 13:
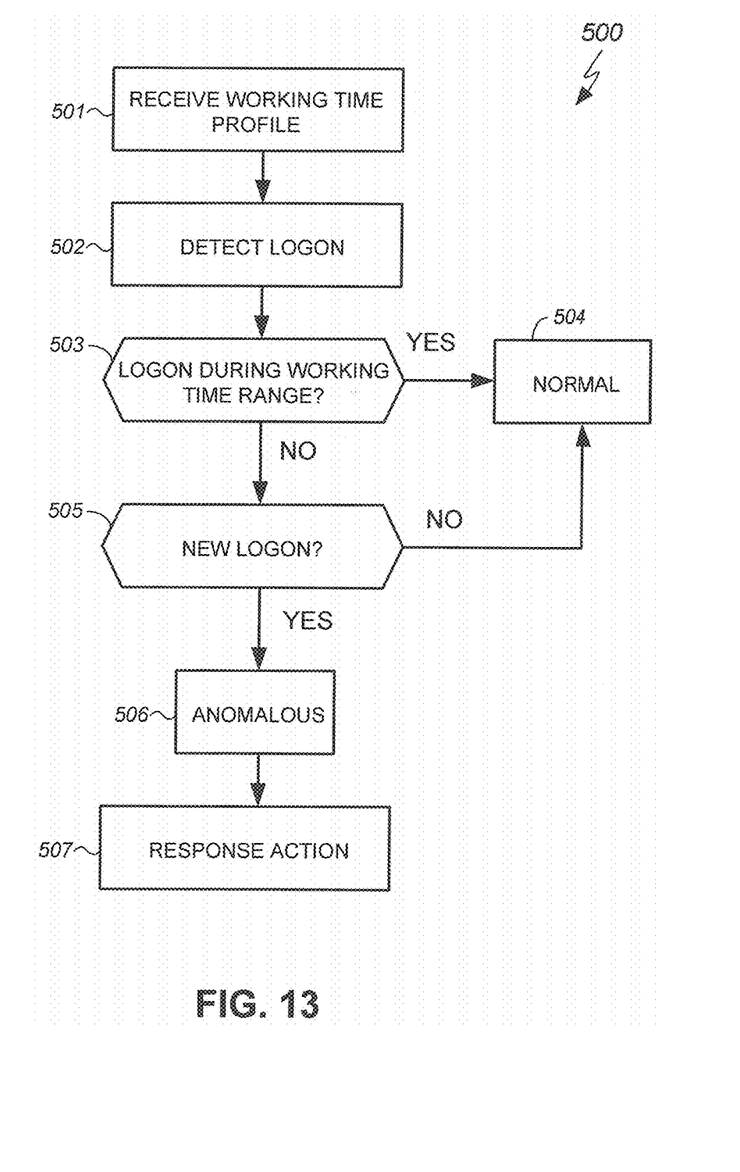
FIG. 13 is a flow diagram of a method of detecting an anomalous logon to a server in accordance with an embodiment of the present invention.

FIG. 13 is a flow diagram of a method 500 of detecting an anomalous logon to a server hosted by a server computer in accordance with an embodiment of the present invention. The method 500 is explained using previously discussed components for illustration purposes.

The method 500 may be implemented by the security module 225 that is running on the server computer 220. In another embodiment, the security module 225 may be running on a computer other than the server computer 220. In that case, the security module 225 may receive the access log 224 of the server 200 over a computer network, and detect anomalous logons to the server 200 based on data from the access log 224.

In the example of FIG. 13, the security module 225 receives the working time profile 212 (step 501). The security module 225 detects an account that is logging on the server 200 (step 502). The security module 225 compares the logon time to the working time range indicated in the working time profile 212 to determine whether or not the logon is during the working time range (step 503). If the account is logging on at a time within the working time range, the security module 225 deems the logon to be normal (step 503 to step 504). As can be appreciated, the security module 225 may subsequently perform other security checks against the account. Such other security checks are not relevant to the present disclosure, and accordingly are not further described herein.

When the account is logging on at a time outside the working time range, but the account has logged on the server 200 before, the security module 225 deems the logon to be normal (step 505 to step 504). The security module 225 may check the access log 224 to get the logon history of the account, and determine whether the account has previously logged on the server 200.

When the account is logging on at a time outside the working time range, and the account has not logged on the server 200 before (i.e., this is the first time the account is logging on), the security module 225 deems the logon to be anomalous (step 505 to step 506). In response to detecting the anomalous logon, the security module 225 may perform a response action against the account (step 507), including blocking the account from accessing the server 200 (and other servers on the enterprise computer network 230), alerting an administrator, etc.

Methods and systems for protecting servers against anomalous logons have been described. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer system comprising a memory and at least one processor, the memory comprising instructions that when executed by the at least one processor cause the computer system to:
   receive a record of access events indicating logons to a server;
   parse the record to get an access event count per time period, the access event count indicating a number of logons to the server;
   perform a plurality of statistical procedures on access event counts parsed from the record:
   aggregate results of the statistical procedures to find candidate working time periods, wherein the results of the statistical procedures are aggregated in a voting process involving the results of the statistical procedures;
   determine a working time range from the aggregated results of the statistical procedures, the working time range having a start time and an end time and comprises candidate working time periods;
   detect a logon of an account to the server; and
   perform a responsive action against the account when the logon of the account is made at a time outside the working time range.

2. The computer system of claim 1, wherein each candidate working time period is an hour.

3. The computer system of claim 1, wherein the access event count per time period is a count of access events in a single day.

4. The computer system of claim 1, wherein the plurality of statistical procedures performed on the access event counts are performed by a backend computer to generate a working time profile indicating the working time range.

5. The computer system of claim 4, wherein the instructions in the memory, when executed by the at least one processor further cause the computer system to:
   receive the working time profile from the backend computer over a computer network.

6. The computer system of claim 5, wherein the computer system is on an enterprise computer network and the backend computer is outside a perimeter of the enterprise computer network.

7. A computer-implemented method comprising:
   parsing a record of access event counts to get an access event count for each time period of a plurality of time periods, the access event count indicating a number of logons to a server that is hosted by a server computer;
   performing a plurality of statistical procedures on access event counts of the plurality of time periods;
   aggregating results of the statistical procedures to find candidate working time periods among the plurality of time periods;
   determining a working time range from the aggregated results of the statistical procedures, the working time range having an end time and a start time and comprising candidate working time periods;

detecting a logon of an account to the server; and performing a responsive action against the account when the logon of the account is made at a time outside the working time range, wherein aggregating the results of the statistical procedures includes a voting process involving the results of the statistical procedures.

8. The method of claim 7, wherein the access event count for each time period of the plurality of time periods is a count of logons during the time period in a single day.

\* \* \* \* \*